Sept. 29, 1970          P. W. SMITH          3,531,736

PHASE-LOCKED LASER WITH MOVING REFLECTOR

Filed July 25, 1967          2 Sheets—Sheet 1

INVENTOR
P. W. SMITH
BY Kenneth W Mateer
ATTORNEY

United States Patent Office 3,531,736
Patented Sept. 29, 1970

3,531,736
PHASE-LOCKED LASER WITH MOVING REFLECTOR
Peter W. Smith, Little Silver, N.J., assignor to Bell Telephone Laboratories, Incorporated, Murray Hill and Berkeley Heights, N.J., a corporation of New York
Filed July 25, 1967, Ser. No. 655,899
Int. Cl. H01s 3/10
U.S. Cl. 331—94.5     2 Claims

ABSTRACT OF THE DISCLOSURE

A phase-locked laser characterized by stable output pulses produced by translating one end mirror of a laser cavity resonator at a constant velocity over a time period $t$ which is long compared with the time taken from the light energy to make a round trip in the laser cavity. The constant velocity is greater than a critical value, which is an increasing function of the ratio of laser gain to cavity loss.

BACKGROUND OF THE INVENTION

Field of the invention

This invention relates to optical masers exhibiting a pulsed output and, more particularly, to lasers in which a plurality of phase-locked longitudinal modes are simultaneously supported.

Description of the prior art

Typical optical masers are capable of supporting a plurality of frequencies simultaneously. These oscillating laser frequencies correspond to the longitudinal modes of the resonant cavity in which the negative temperature medium is disposed, and are separated in frequency an amount equal to one-half the velocity of light ($c$) divided by the cavity length (L). The gain curve of the active medium spans several of these mode frequencies. In the early lasers, each of the simultaneously oscillating modes had a phase independent of the phases of the others. It was discovered that by modulating the cavity length, or cavity loss, at a frequency closely related to the $c/2L$ frequency, the power in each oscillating mode could be phase locked, producing an output consisting of a series of sharp, high intensity pulses spaced in time by $2L/c$.

Thus, phase locking of laser modes refers to the maintenance of a fixed phase relationship with respect to time between the oscillating laser frequencies corresponding to the longitudinal modes of the resonant cavity of a laser. Phase locking of a multimode laser by means of an internal phase perturbation at a frequency corresponding to the $c/2L$ separation frequency is disclosed, for example, in the copending, commonly-assigned application of L. E. Hargrove, Ser. No. 362,319, filed Apr. 24, 1964, now Pat. No. 3,412,251.

In the Hargrove application, an element having a dielectric constant whose magnitude is controllable by the application of an external signal introduces the phase perturbation. The varying dielectric constant effectively varies the electrical length of the cavity. A mechanical embodiment of the phase-locked laser is described on page 2189 of vol. 37, 1966, of the Journal of Applied Physics, in an article by W. C. Henneberger and H. J. Schulte entitled "Optical Pulses Produced by Laser Length Variation." In this arrangement, one cavity reflector vibrates at the $c/2L$ frequency to produce an output consisting of mode-locked pulses.

T. J. Bridges, in his copending, commonly-assigned application Ser. No. 566,892, filed July 21, 1966, now Pat. No. 3,465,358, describes a molecular gas laser with a pulsed output. The pulsed output is obtained by moving one cavity reflector to establish repetitively the $nc/2L$ condition for oscillation of the single available laser mode. Since a plurality of competing wave modes is not present under the gain curve in the Bridges structure, no opportunity for mode locking is presented.

Whereas the prior art structures are relatively complicated to assemble and to adjust, an important object of the present invention is to produce stable phase locking in a multimode laser in a relatively simple manner.

SUMMARY OF THE INVENTION

In accordance with the principles of the present invention, stable phase-locked laser operation is achieved by translating above a critical velocity one end mirror of a laser cavity which is simultaneously supportive of a plurality of longitudinal modes. The critical velocity is that for which the longitudinal mode frequencies are swept over approximately two $c/2L$ spacings in the time taken for energy to build up to a steady state in the laser cavity and is an increasing function of the ratio of laser gain to cavity loss. The mirror translation continues for a time $t$ long compared to the time taken for the light energy to complete a round trip in the laser cavity. In a first embodiment, the translation is accomplished by mounting one laser mirror on a movable carriage having a long rail support with reversing controls at each end to permit recycling. Alternatively, the end mirror can be mounted on an oscillating support having sufficiently high velocity over a major portion of its movement.

BRIEF DESCRIPTION OF THE DRAWING

The above and other objects of the invention, together with its various features and advantages, can be more readily understood from reference to the accompanying drawing, in which.

DETAILED DESCRIPTION

Figure 1:
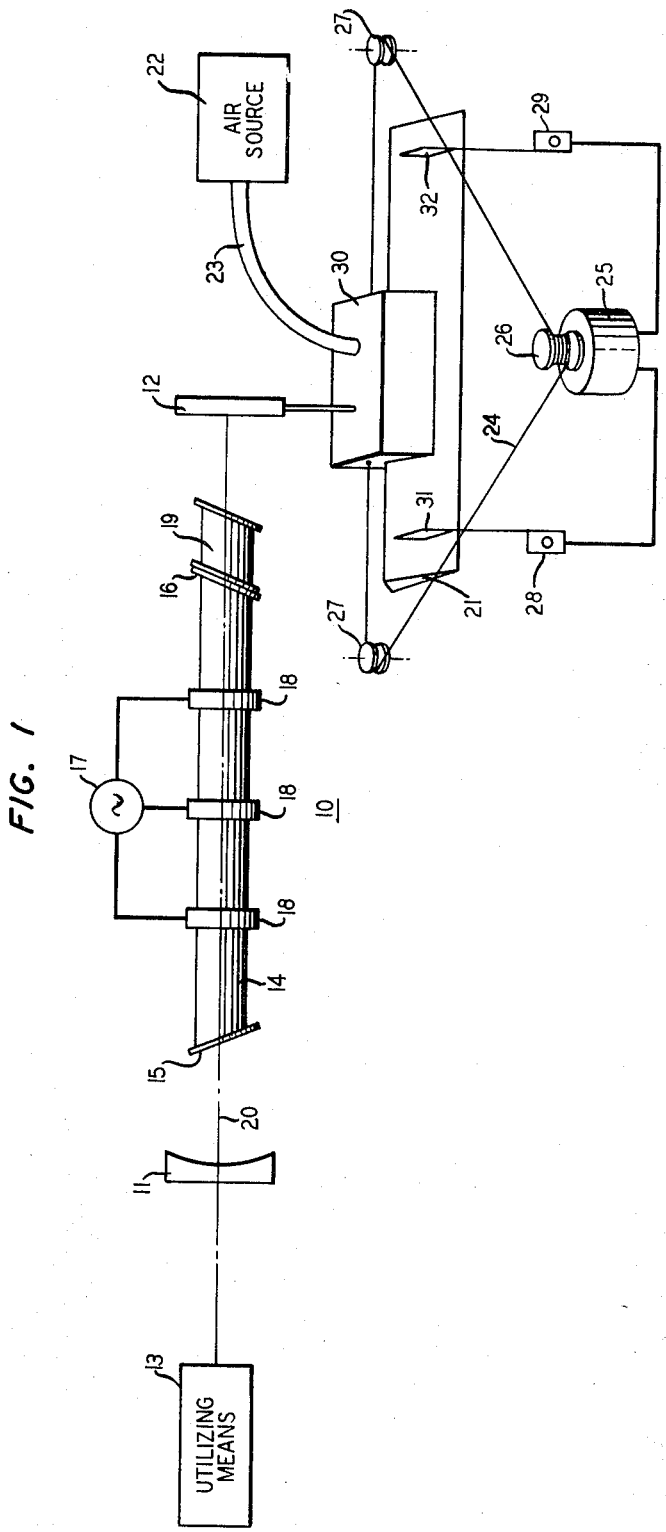
FIG. 1 is a schematic representation of a laser in accordance with the principles of the invention.

The laser 10 shown in FIG. 1 comprises an active medium disposed within a resonant optical cavity formed by axially-spaced end reflectors 11 and 12. The surfaces of reflectors 11, 12 can, for example, comprise a metallic layer on a dielectric base or a plurality of alternate layers of material of high and low index of refraction, each layer being one-quarter wavelength thick at the desired frequency of operation. If energy is to be abstracted through cavity extremities, either or both of the end reflectors can be made partially transmissive. Otherwise, their reflectivity is typically made to exceed 99 percent. In FIG. 1, reflector 11 is illustrated as partially transmissive, the transmitted energy being directed toward utilizing means 13, which can be a detector, amplifier, long line transmission section, or other suitable component.

The negative temperature or active medium, which in the arrangement of FIG. 1 is a gas or a gas mixture, is disposed between, and on the axis 20 joining, reflectors 11, 12. The active medium is shown as contained within an elongated tube 14 having end surfaces 15, 16 oriented substantially at Brewster's angle to the energy beam which propagates therethrough along axis 20. The gaseous medium can comprise, for example, a mixture of helium and neon excited by a radio frequency source 17 coupled to conductive straps 18 which encircle tube 14. Gaseous lasers of this type and their principles of operation are now well known in the art. When a helium-neon system is used, it is often desirable to suppress the oscillations at $3.39\mu$. In FIG. 1, this is accomplished by methane cell 19 which is highly lossy at this wavelength but transmissive at the desired 6328 A. wavelength. It is to be understood that this invention can be practiced with liquid or solid state active media, as well as with gaseous media of different compositions. It is required, however, that the negative temperature medium provide gain over a sufficient frequency range to sustain a plurality of simultaneously oscillating longitudinal modes. The excitation means can, of course, be of the direct-current type if appropriate.

Reflector 12 is shown, in accordance with the principles of this invention, supported by a movable carriage 30 which is slidably mounted on a triangular rail 21. Air at a pressure of a few pounds per square inch is introduced from source 22 through tubing 23 into carriage 30 and escapes through small holes in the carriage undersides adjacent rail 21. When air is supplied, the carriage floats on the rail and can be easily translated therealong by cord 24 attached near the center of gravity of the carriage. A variable speed drive motor 25 drives a drum 26 which winds in the cord as it passes around pulleys 27. Reversing switches 28, 29 are positioned on rail 21 and are tripped when carriage 30 engages sensors 31, 32 at the extremity of each pass, thereby allowing a continuous back and forth motion.

As mentioned previously, the described laser, with stationary end reflectors, operates in a single transverse mode and a plurality of longitudinal modes. In order to obtain mode locking with stable pulsed output, one of the end reflectors is translated at a substantially constant velocity over a time period $t$ which is longer than the round-trip time in the cavity. More specifically, mode locking is observed in accordance with the principles of the invention when the reflector is moved at a velocity for which the longitudinal mode frequencies of the laser are swept over at least two $c/2L$ spacings in the time period $t$. A typical critical velocity for the mirror translation is 5 centimeters per second. At mirror velocities at or above the critical velocity, stable pulses of duration $2L/c$ are produced.

Figure 3:
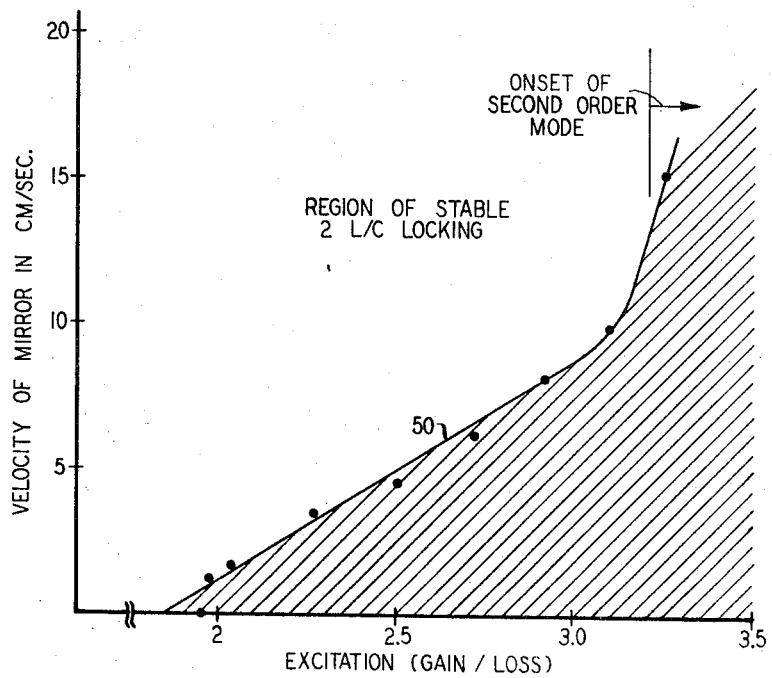
FIG. 3 is a graphical representation useful in understanding the operation of the arrangements of FIGS. 1 and 2.

FIG. 3 is a graphical representation of the performance of lasers phase locked by a translated end reflector. In FIG. 3, the critical velocity of translation for $2L/c$ pulses is plotted as a function of the ratio of laser gain to cavity loss, known as excitation. It can be seen from curve 50 that over a range of excitation from about 1.7 to 3.2, the critical velocity rises linearly.

Figure 2:
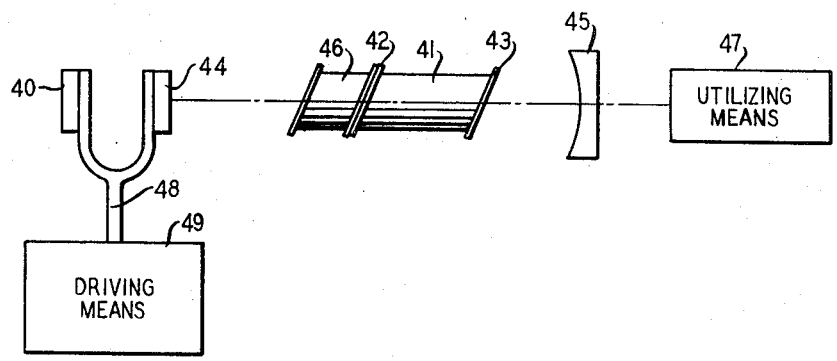
FIG. 2 is a laser embodiment alternative to that of FIG. 1.

An alternative embodiment incorporating the principles of translated end mirror mode locking is shown in FIG. 2 of the drawing. In FIG. 2, the active medium 41 is again illustrated as a gaseous medium within an enclosure having Brewster angle end surfaces 42, 43, disposed on the axis of the cavity formed by reflective end members 44, 45. A methane cell 46 to absorb unwanted laser frequencies is included as described hereinbefore. Energy can be abstracted for utilization by external means 47 by making one of the end reflectors partially transmissive.

The translation of end mirror 44 in accordance with the mode locking principles of the invention is accomplished by mounting the mirror on one tine of a tuning fork 48 which is vibrated by driving means 49. A counterweight 40 is disposed on the remaining tine of the tuning fork to permit a balanced oscillation.

Energization of the tuning fork produces sinusoidal motion of the end mirror 44. However, over a major portion of each sinusoidal cycle, the velocity is greater than the minimum velocity required for locking. It is over this range that mode locking occurs. The critical velocity requirements are similar to those for the embodiment of FIG. 1. The tuning fork embodiment has experimentally produced narrow output pulses over 90–95% of its cycle. There is a small region at the peak of each cycle of the mirror travel for which the mirror velocity falls below the critical velocity, resulting in unlocking of the laser modes and producing free running operation. The particular tuning fork arrangement for which experimental data has been obtained was manufactured by American Time Products and is designated 1 BEL 40. The frequency of oscillation was 100 hertz. Since the $c/2L$ frequency for the laser setup used was roughly 100 megahertz, it can be readily appreciated that the present mode locking phenomenon is distinct from the prior art mechanical (or electrical) cavity length variation at a $c/2L$ rate.

In all cases it is understood that the above-described arrangements are merely illustrative of the principles of the present invention. Numerous and varied other arrangements can be devised in accordance with these principles by those skilled in the art without departing from the spirit and scope of the present invention.

What is claimed is:

1. A phase-locked laser comprising an optically resonant cavity having first and second axially-spaced reflective surfaces, an active medium adapted to be pumped for stimulated emission disposed on said axis between said reflective surfaces, means for pumping said medium to produce a ratio of laser gain to cavity loss which supports multiple axial modes in a single transverse mode, and means for abstracting for utilization a portion of the output of said laser, said laser being characterized in that one of said reflective surfaces includes means for axially translating said surface at a substantially constant velocity which is greater than a critical velocity of the order of magnitude of one centimeter per second for at least a time as long as the time taken for energy to build up to a steady state in said cavity, said critical velocity increasing substantially lineraly with increasing values of said ratio of laser gain to cavity loss over a substantial range of said ratio.

2. The laser according to claim 1 in which said one reflective surface is mounted on vibratable means comprising a tuning fork.

References Cited

UNITED STATES PATENTS 3,395,606  8/1968  Neill _____ 331—94.5
3,437,955  4/1969  Enloe et al. _____ 331—94.5

OTHER REFERENCES

Rowley et al., Wavelength Stabilization of an Optical Maser, Nature, vol. 200, No. 4908 (Nov. 23, 1963) pp. 745–747.

Henneberger et al., Optical Pulses Produced by Laser Length Variation, J. Appl. Phys., vol. 37, No. 5 (April 1966) p. 2189.

RONALD L. WIBERT, Primary Examiner

W. L. SIKES, Assistant Examiner

U.S. Cl. X.R.

350—266, 285